United States Patent
Kim et al.

(10) Patent No.: US 11,208,553 B2
(45) Date of Patent: Dec. 28, 2021

(54) THERMOPLASTIC RESIN COMPOSITION HAVING EXCELLENT ELECTRICAL PROPERTIES, AND MOLDED ARTICLE PRODUCED USING SAME

(71) Applicant: Lotte Advanced Materials Co., Ltd., Yeosu-si (KR)

(72) Inventors: Suji Kim, Uiwang-si (KR); Sunyoung Kim, Uiwang-si (KR); Pilho Kim, Uiwang-si (KR); Seungshik Shin, Uiwang-si (KR); Woo Jin Lee, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 16/469,838

(22) PCT Filed: Nov. 13, 2017

(86) PCT No.: PCT/KR2017/012792
§ 371 (c)(1),
(2) Date: Jun. 14, 2019

(87) PCT Pub. No.: WO2018/117424
PCT Pub. Date: Jun. 28, 2018

(65) Prior Publication Data
US 2019/0359820 A1 Nov. 28, 2019

(30) Foreign Application Priority Data
Dec. 21, 2016 (KR) .................. 10-2016-0175832

(51) Int. Cl.
*C08L 69/00* (2006.01)
*C08K 5/5399* (2006.01)
*C08L 27/12* (2006.01)

(52) U.S. Cl.
CPC .......... *C08L 69/00* (2013.01); *C08K 5/5399* (2013.01); *C08L 27/12* (2013.01); *C08L 2201/02* (2013.01); *C08L 2203/20* (2013.01)

(58) Field of Classification Search
CPC ........ C08L 69/00; C08L 27/12; C08K 5/5399
See application file for complete search history.

(56) References Cited

U.S. PATENT DOCUMENTS

| | | | |
|---|---|---|---|
| 6,531,534 B1 | 3/2003 | Katayama | |
| 6,828,366 B2 | 12/2004 | Seidel et al. | |
| 7,553,895 B2 | 6/2009 | An et al. | |
| 7,659,332 B2 | 2/2010 | Kang et al. | |
| 9,771,467 B2 | 9/2017 | Han et al. | |
| 2003/0105196 A1 | 6/2003 | Seidel et al. | |
| 2005/0245648 A1 | 11/2005 | Lim et al. | |
| 2011/0275743 A1 | 11/2011 | Ishii et al. | |
| 2013/0313493 A1 | 11/2013 | Wen et al. | |
| 2013/0317141 A1 | 11/2013 | Cheng et al. | |
| 2013/0317142 A1 | 11/2013 | Chen et al. | |
| 2013/0317143 A1 | 11/2013 | Daga et al. | |
| 2013/0317144 A1 | 11/2013 | Wu et al. | |
| 2013/0317145 A1 | 11/2013 | An et al. | |
| 2013/0317146 A1 | 11/2013 | Li et al. | |
| 2013/0317147 A1 | 11/2013 | Lie et al. | |
| 2013/0317148 A1 | 11/2013 | Zheng et al. | |
| 2013/0317149 A1 | 11/2013 | Zhao et al. | |
| 2013/0331492 A1 | 12/2013 | Sharma | |
| 2014/0303296 A1 | 10/2014 | Inazawa et al. | |
| 2014/0371360 A1 | 12/2014 | Zheng et al. | |
| 2015/0140248 A1 | 5/2015 | Ra et al. | |
| 2015/0307707 A1* | 10/2015 | Jung | C07F 9/659 252/500 |
| 2015/0329719 A1* | 11/2015 | Jung | C08L 27/18 524/504 |
| 2015/0344670 A1 | 12/2015 | Han et al. | |
| 2016/0024301 A1 | 1/2016 | Hayashida | |
| 2016/0185956 A1 | 6/2016 | Jung et al. | |
| 2020/0109261 A1 | 4/2020 | Kim et al. | |

FOREIGN PATENT DOCUMENTS

| | | |
|---|---|---|
| CN | 1408008 A | 4/2003 |
| CN | 1649961 A | 8/2005 |
| CN | 101434743 A | 5/2009 |
| CN | 102307947 A | 1/2012 |
| CN | 103958607 A | 7/2014 |
| CN | 104650565 A | 5/2015 |
| CN | 104812820 A | 7/2015 |
| CN | 104812824 A | 7/2015 |
| CN | 104812825 A | 7/2015 |
| CN | 105315640 A | 2/2016 |

(Continued)

OTHER PUBLICATIONS

English machine translation of JP 2001-002908. (Year: 2001).*
International Search Report in counterpart International Application No. PCT/KR2017/012792 dated Feb. 19, 2018, pp. 1-4.
Extended Search Report in counterpart European Application No. 17884617.6 dated Apr. 8, 2020, pp. 1-8.
Extended European Search Report in commonly owned European Patent Application No. 17880465.4, dated Jun. 25, 2020, pp. 1-8.
Machine translation of JP 2010-196009, pp. 1-37.
International Search Report in commonly owned International Application No. PCT/KR2017/012149 dated Feb. 12, 2018, pp. 1-4.
Office Action in commonly owned U.S. Appl. No. 16/469,319 dated Jun. 22, 2020, pp. 1-11.
Office Action in counterpart Chinese Application No. 201780079506.8 dated Dec. 3, 2020, pp. 1-8.
English-translation of Office Action in counterpart Chinese Application No. 201780079506.8 dated Dec. 3, 2020, pp. 1-8.

(Continued)

*Primary Examiner* — John E Uselding
(74) *Attorney, Agent, or Firm* — Addition, Pendleton & Witherspoon, P.A.

(57) ABSTRACT

Provided is a thermoplastic resin composition having excellent electrical properties, and the thermoplastic resin composition comprises: (A) 100 parts by weight of polycarbonate; (B) 2 parts by weight to 6 parts by weight of a cyclic phosphazene compound flame retardant; (C) 0.1 parts by weight to 5 parts by weight of an impact-reinforcing agent; and (D) 1 part by weight to 3 parts by weight of a fluorinated polyolefin.

18 Claims, No Drawings

(56) References Cited

FOREIGN PATENT DOCUMENTS

| | | | |
|---|---|---|---|
| CN | 106009587 A | 10/2016 | |
| EP | 0728811 A2 | 8/1996 | |
| GN | 1296515 A | 5/2001 | |
| GN | 105051110 A | 11/2015 | |
| JP | 2001002908 * | 1/2001 | ............ C08L 69/00 |
| JP | 2004-027113 A | 1/2004 | |
| JP | 2005-015659 A | 1/2005 | |
| JP | 2007-308529 A | 11/2007 | |
| JP | 4146175 B2 | 9/2008 | |
| JP | 2010-196009 A | 9/2010 | |
| JP | 5179731 B2 | 4/2013 | |
| JP | 5237511 B2 | 7/2013 | |
| JP | 5405738 B2 | 2/2014 | |
| JP | 2015-227421 A | 12/2015 | |
| JP | 2016-084414 A | 5/2016 | |
| JP | 2016-102219 A | 6/2016 | |
| KR | 10-2002-0079944 A | 10/2002 | |
| KR | 10-2005-0023868 A | 10/2005 | |
| KR | 10-0722149 | 5/2007 | |
| KR | 10-2009-0020648 A | 2/2009 | |
| KR | 10-2015-0023441 A | 3/2015 | |
| KR | 10-2015-0059077 A | 5/2015 | |
| KR | 10-2015-0120823 A | 10/2015 | |
| KR | 10-2015-0139046 A | 12/2015 | |
| KR | 10-1578732 B1 | 12/2015 | |
| KR | 10-2016-0079786 A | 7/2016 | |
| KR | 10-2016-0058456 A | 9/2017 | |
| KR | 10-2015-0023463 A | 12/2018 | |
| WO | 2004-003078 A | 1/2004 | |
| WO | 2015/166381 A1 | 11/2015 | |
| WO | 2018/110824 A1 | 6/2018 | |
| WO | 2018/117424 A2 | 6/2018 | |

OTHER PUBLICATIONS

Final Office Action in commonly owned U.S. Appl. No. 16/469,319 dated Oct. 13, 2020, pp. 1-13.

Office Action in commonly owned Chinese Application No. 201780077638.7 dated Nov. 4, 2020, pp. 1-10.

English-translation of Office Action in commonly owned Chinese Application No. 201780077638.7 dated Nov. 4, 2020, pp. 1-13.

Office Action in commonly owned Chinese Application No. 201780077638.7 dated May 24, 2021, pp. 1-7.

English-translation of Office Action in commonly owned Chinese Application No. 201780077638.7 dated May 24, 2021, pp. 1-8.

* cited by examiner

THERMOPLASTIC RESIN COMPOSITION HAVING EXCELLENT ELECTRICAL PROPERTIES, AND MOLDED ARTICLE PRODUCED USING SAME

CROSS-REFERENCE TO RELATED APPLICATIONS

This application claims priority to and the benefit of International Application No. PCT/KR2017/012792, filed Nov. 13, 2017, which published as WO 2018/117424 on Jun. 28, 2018; and Korean Patent Application No. 10-2016-0175832, filed in the Korean Intellectual Property Office on Dec. 21, 2016, the entire disclosure of each of which is incorporated herein by reference.

TECHNICAL FIELD

A thermoplastic resin composition having excellent electrical properties and a molded article produced using the same are disclosed.

BACKGROUND ART

A polycarbonate resin is an engineering plastic having excellent mechanical strength, high heat resistance, transparency, and the like, and therefore may be used in various fields such as office automation devices, electric/electronic parts, architectural materials, and the like. In the field of electric/electronic parts, a resin used as external components of a laptop and a computer requires high flame retardancy and high strength due to slimming and thinning of TV, a monitor, and a laptop.

In addition, a polycarbonate material used for housing the electric/electronic parts requires excellent electrical properties and impact strength along with the high flame retardancy.

In general, in order to improve the flame retardancy, a phosphorus-based flame retardant may be increasingly used, but it causes to deteriorate heat resistance and impact strength, and accordingly, in order to improve this impact performance, when an impact-reinforcing agent is increasingly used, flame retardancy is deteriorated.

DETAILED DESCRIPTION OF THE INVENTION

Technical Problem

An embodiment provides a thermoplastic resin composition having excellent electrical properties, flame retardancy, and mechanical characteristics.

Another embodiment provides a molded article produced using the thermoplastic resin composition.

These and other objects of the present invention may be achieved by the present invention described below.

Technical Solution

An embodiment provides a thermoplastic resin composition having excellent electrical properties including (A) 100 parts by weight of polycarbonate; (B) 2 parts by weight to 6 parts by weight of a cyclic phosphazene compound flame retardant; (C) 0.1 parts by weight to 5 parts by weight of an impact-reinforcing agent; and (D) 1 part by weight to 3 parts by weight of a fluorinated polyolefin.

An amount of the fluorinated polyolefin may be 1.5 parts by weight to 3 parts by weight.

An amount of the cyclic phosphazene compound flame retardant may be 3 parts by weight to 6 parts by weight.

The cyclic phosphazene compound flame retardant may be represented by Chemical Formula 1.

[Chemical Formula 1]

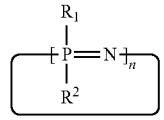

In Chemical Formula 1, $R^1$ and $R^2$ are independently an alkyl group, an alkoxy group, an aryl group, or an aryloxy group, and n is an integer ranging from 1 to 4.

A weight average molecular weight (Mw) of the polycarbonate resin may be 10,000 g/mol to 200,000 g/mol.

The thermoplastic resin composition may have a comparative tracking index (CTI) value of greater than or equal to 450 V.

The thermoplastic resin composition may have 5VB grade in a UL94 vertical flame retardancy test.

The thermoplastic resin composition may have an impact strength of greater than or equal to 40 kgf·cm/cm as measured in accordance with ASTM D256 standard.

The thermoplastic resin composition may be used as materials for electric and electron parts.

Another embodiment provides a plastic molded article produced by the thermoplastic resin composition.

Advantageous Effects

The thermoplastic resin composition having excellent electrical properties according to an embodiment may exhibit improved mechanical characteristics such as electrical properties and impact properties as well as maintain flame retardancy and simultaneously minimize heat resistance deterioration.

MODE FOR INVENTION

A thermoplastic resin composition having excellent electrical properties according to an embodiment includes (A) 100 parts by weight of polycarbonate; (B) 2 parts by weight to 6 parts by weight of a cyclic phosphazene compound flame retardant; (C) 0.1 parts by weight to 5 parts by weight of an impact-reinforcing agent; and (D) 1 part by weight to 3 parts by weight of a fluorinated polyolefin.

Hereinafter, the present invention is described in detail.

(A) Polycarbonate Resin

The (A) thermoplastic polycarbonate resin that is a component used for preparing the resin composition of the present invention is an aromatic polycarbonate resin prepared by reacting diphenols represented by Chemical Formula 2 with phosgene, halogen formate, or carbonate diester.

[Chemical Formula 2]

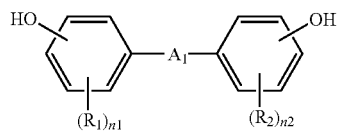

In Chemical Formula 2,

A₁ is selected from a single bond, a substituted or unsubstituted C1 to C5 alkylene, a substituted or unsubstituted C1 to C5 alkylidene, a substituted or unsubstituted C3 to C6 cycloalkylene, a substituted or unsubstituted C5 to C6 cycloalkylidene, CO, S, and $SO_2$, $R_1$ and $R_2$ are independently selected from a substituted or unsubstituted C1 to C30 alkyl and a substituted or unsubstituted C6 to C30 aryl, and $n_1$ and $n_2$ are independently an integer ranging from 0 to 4.

The term "substituted" refers to a group which hydrogen is substituted with a substituent selected from a halogen, a C1 to C30 alkyl, a C1 to C30 haloalkyl, a C6 to C30 aryl, a C2 to C30 heteroaryl, a C1 to C20 alkoxy, and a combination thereof.

Examples of the diphenol may be hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like. Among the diphenols, 2,2-bis-(4-hydroxyphenyl)-propane, 2,2-bis-(3,5-dichloro-4-hydroxyphenyl)-propane, or 1,1-bis-(4-hydroxyphenyl)-cyclohexane may be desirably used. In addition, 2,2-bis-(4-hydroxyphenyl)-propane that is referred to as bisphenol-A may be desirably used.

A weight average molecular weight (Mw) of the polycarbonate resin may be 10,000 g/mol to 200,000 g/mol, according to an embodiment, 15,000 g/mol to 80,000 g/mol, but is not limited thereto.

The polycarbonate resin may be a mixture of copolymers prepared from two types of diphenols. In addition, the polycarbonate resin may be a linear polycarbonate resin, a branched polycarbonate resin, a polyestercarbonate copolymer resin, and the like.

The linear polycarbonate resin may be a bisphenol-A-based polycarbonate resin.

The branched polycarbonate resin may be prepared by reacting a multi-functional compound having at least tri functional groups, for example a compound having trivalent or more phenolic groups, for specific examples a multi-functional aromatic compound such as trimellitic anhydride, trimellitic acid, and the like with diphenols and a carbonate. The multi-functional aromatic compound may be included in an amount of 0.05 mol % to 2.0 mol % based on a total amount of branched polycarbonate resin.

The polyester carbonate copolymer resin may be prepared by reacting bifunctional carboxylic acid with diphenols and carbonate. The carbonate may be diaryl carbonate such as diphenyl carbonate or ethylene carbonate.

The polycarbonate resin may be preferably homo-polycarbonate resin, co-polycarbonate resin, or a blend of co-polycarbonate resin and homo-polycarbonate resin.

An amount of the polycarbonate resin in the thermoplastic resin composition may be 80 wt % to 100 wt % based on 100 wt % of the thermoplastic resin.

(B) Cyclic Phosphazene Compound Flame Retardant

The cyclic phosphazene flame retardant used in the resin composition of the present invention may be represented by Chemical Formula 1.

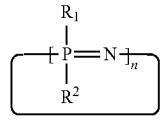

[Chemical Formula 1]

In Chemical Formula 1, $R^1$ and $R^2$ are independently an alkyl group, an alkoxy group, an aryl group, or an aryloxy group, and n is an integer ranging from 1 to 4.

In an embodiment, $R^1$ and $R^2$ may independently be an aryl group or an aryloxy group.

The alkyl group and the alkoxy group may be a C1 to C4 alkyl group and alkoxy group.

In an embodiment, an amount of the cyclic phosphazene may be 2 parts by weight to 6 parts by weight, or 3 parts by weight to 6 parts by weight based on 100 parts by weight of the polycarbonate resin. When the amount of the cyclic phosphazene is less than 2 parts by weight, flame retardancy may be deteriorated, while when it exceeds 6 parts by weight, thermal stability may be deteriorated, which is not suitable.

(C) Impact-Reinforcing Agent

An impact-reinforcing agent according to an embodiment of the present invention may include a copolymer having a core-shell structure, an olefin-based copolymer, or a combination thereof. This impact-reinforcing agent may work as an impact-reinforcing agent in the polycarbonate-based thermoplastic resin composition.

An amount of the impact-reinforcing agent may be 0.1 parts by weight to 5 parts by weight based on 100 parts by weight of the polycarbonate resin. When the amount of the impact-reinforcing agent content is less than 0.1 parts by weight, it is difficult to obtain a high impact characteristic, while when it exceeds 5 parts by weight, flame retardancy and thermal stability may be deteriorated, which is not suitable.

The core-shell graft copolymer may have a core-shell structure where an unsaturated monomer is grafted on a core structure of a rubber to form a hard shell and is a copolymer including a unsaturated compound of an acryl-based monomer, a heterocyclic monomer, an aromatic vinyl monomer, an unsaturated nitrile monomer, or a combination thereof which is grafted on a rubber polymer from polymerization of a monomer of a diene-based monomer, an acryl-based monomer, a silicon-based monomer, or a combination thereof.

The diene-based monomer may be C4 to C6 butadiene, isoprene, and the like, and specifically butadiene may be used. Specific examples of the rubber polymer obtained from polymerization of the diene-based monomer may be a butadiene rubber, an acrylic rubber, a styrene/butadiene rubber, an acrylonitrile/butadiene rubber, an isoprene rubber, an ethylene-propylene-diene terpolymer (EPDM), an acryl/butadiene rubber, an acryl-butadiene-styrene a rubber, and the like.

The acryl-based monomer may be methyl(meth)acrylate, ethyl(meth)acrylate, n-propyl(meth)acrylate, n-butyl(meth)acrylate, hexyl(meth)acrylate, 2-ethylhexyl(meth)acrylate, and the like. Herein, a hardener of ethylene glycoldi(meth)acrylate, propylene glycoldi(meth)acrylate, 1,3-butylene glycoldi(meth)acrylate, 1,4-butylene glycoldi(meth)acrylate, allyl(meth)acrylate, triallylcyanurate, and the like may be used.

The silicon-based monomer may be a cyclosiloxane compound of hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, or a combination thereof. Herein, a hardener of trimethoxymethylsilane, triethoxyphenylsilane, tetramethoxysilane, tetraethoxysilane, and the like may be used.

It is desirable that the rubber polymer has an average particle diameter ranging from 0.4 μm to 1 μm in terms of balance of impact resistance and coloring properties.

The acryl-based monomer of the unsaturated compound may include (meth)acrylic acid alkyl ester, (meth)acrylic acid ester, or a combination thereof. Herein, the alkyl may refer to a C1 to C10 alkyl, specific examples of the (meth)acrylic acid alkyl ester may be methyl(meth)acrylate, ethyl(meth)acrylate, propyl(meth)acrylate, butyl(meth)acrylate, and methyl(meth)acrylate is preferable The heterocyclic monomer may include maleic anhydride, alkyl or phenyl N-substituted maleimide, and the like.

The aromatic vinyl monomer includes styrene, C1-C10 alkyl-substituted styrene, halogen-substituted styrene, or a combination thereof. The alkyl-substituted styrene includes o-ethyl styrene, m-ethyl styrene, p-ethyl styrene, α-methyl styrene, and the like.

The unsaturated nitrile monomer includes acrylonitrile, methacrylonitrile, ethacrylonitrile, or a combination thereof.

An example of a polymer formed from at least one monomer among the unsaturated compounds is polymethylmethacrylate.

The copolymer of the core-shell structure may consist of 30 to 70 wt % of the rubber polymer and 30 to 70 wt % of the unsaturated compound grafted thereon. When the copolymer of the core-shell structure has the above ratio, compatibility with the polycarbonate resin may be improved so that the impact-reinforcing effect may be maximized.

Specific examples of the impact-reinforcing agent may be a methylmethacrylate-butadiene-styrene copolymer, a methylmethacrylate-acrylonitrile-butadiene-styrene copolymer, a methyl methacrylate-butadiene copolymer, a methyl methacrylate-acryl butadiene rubber copolymer, a methyl methacrylate-acryl butadiene rubber-styrene copolymer, or a combination thereof.

The impact-reinforcing agent may have an average particle size of 0.1 μm to 0.5 μm, and when the impact-reinforcing agent has an average particle size within the range, it is well dispersed in a matrix of the thermoplastic resin and thus may easily absorb an impact imposed from outside and thus increase an impact-reinforcing effect. In the present specification, when a definition is not otherwise provided, the average particle size refers to an average particle diameter (D50) and the average particle diameter (D50) refers to a diameter of a particle with a cumulative volume of 50 volume % in a particle distribution.

(D) Fluorinated Polyolefin

In an embodiment, an amount of the fluorinated polyolefin may be 1 part by weight to 3 parts by weight, or 1.5 parts by weight to 3 parts by weight based on 100 parts by weight of the polycarbonate resin. When the amount of the fluorinated polyolefin is less than 1 part by weight, flame retardancy may be deteriorated, while when it exceeds 3 parts by weight, impact resistance may be deteriorated, which is not suitable.

The fluorinated polyolefin resin may be a polytetrafluoroethylene resin, a polyfluoroethylene resin, a polyfluoropropylene resin, a polyfluorobutyrene resin, polyvinylidenefluoride, a tetrafluoroethylene/vinylidenefluoride copolymer, a tetrafluoroethylene/hexafluoropropylene copolymer, and an ethylene/tetrafluoroethylene copolymer. These may be used independently alone or in a combination of two or more different types.

(E) Other Additives

The thermoplastic resin composition having excellent electrical properties according to an embodiment may further include an additive including an ultraviolet (UV) stabilizer, a fluorescent whitening agent, a lubricant, a release agent, a stabilizer, or an inorganic material additive in addition to the above components, according to its use. A mineral filler is not suitable as other additives due to degradation of impact and electrical properties.

The ultraviolet (UV) stabilizer suppresses a color change and a decrease in photo-reflectivity of the resin composition that may be caused by UV irradiation and examples of the UV stabilizer include a benzotriazole-based compound, a benzophenone-based compound, and a triazine-based compound.

The fluorescent whitening agent improves photo-reflectivity of a polycarbonate resin composition and examples of the fluorescent whitening agent include stilbene-bisbenzoxazole derivatives such as 4-(benzoxazol-2-yl)-4'-(5-methylbenzoxazol-2-yl)stilbene and 4,4'-bis(benzooxazol-2-yl) stilbene.

The lubricant may be montanic acid wax, a pentaerythritol derivative, or a fatty acid ester of neopentylpolyol.

The release agent may be a fluorine-containing polymer, silicone oil, a metal salt of stearate, a metal salt of montanic acid, a montanic acid ester wax, or polyethylene wax.

In addition, the stabilizer may be a hindered phenol primary antioxidant, for example, octadecyl 3-(3,5-di,t,butyl-4-hydroxy phenyl) propionate), bis(2,6-di-tert-butyl-4-methyl-phenyl)pentaerythritol diphosphite, tri(2,4-di-tert-butyl phenyl)phosphite, tetrakis(methylene-3-dodecylthio propionate)methane, or a combination thereof.

The inorganic material additive may be a glass fiber, silica, clay, calcium carbonate, calcium sulfate, or glass bead.

The thermoplastic resin composition according to an embodiment may have a comparative tracking index (CTI) value of greater than or equal to 450V, or 500V to 600V. In addition, the thermoplastic resin composition may have 5VB grade in a UL94 vertical flame retardancy test.

The thermoplastic resin composition may have an impact strength measured according to ASTM D256 standard of greater than or equal to 40 kgf·cm/cm, and according to an embodiment, 45 kgf·cm/cm to 80 kgf·cm/cm.

The thermoplastic resin composition having such a configuration according to an embodiment may be useful as materials for electric and electron parts. Particularly, the thermoplastic resin composition according to an embodiment may be usefully used for power boxes of white appliances such as refrigerators, washing machines, and the like.

The present invention will be further illustrated by the following examples, which are merely specific examples of the present invention and are not intended to limit or limit the scope of the present invention.

EXAMPLES

The (A) polycarbonate resin, (B) cyclic phosphazene compound flame retardant, (C) impact-reinforcing agent, and (D) fluorinated polyolefin used in examples of the present invention and comparative examples are as follows.

(A) Polycarbonate Resin

Bisphenol-A type polycarbonate having a weight average molecular weight of 25,000 g/mol was used.

(B-1) Cyclic Phosphazene Flame Retardant

A cyclic phosphazene compound flame retardant of Chemical Formula 1 (SP-100, manufactured by Otsuka Chemical) was used.

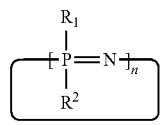

[Chemical Formula 1]

In Chemical Formula 1, $R^1$ and $R^2$ are an aryloxy group, and n is 3.

(B-2) Phosphorus-Based Flame Retardant

In comparative examples, a phosphate ester-based compound (diarylphosphate $([(CH_3)_2C_6H_3O]_2P(O)OC_6H_4OP(O)[OC_6H_3(CH_3)_2]_2)$, Product name: PX-200, Manufacturer: DAIHACHI) was used as a phosphorus-based flame retardant.

(C) Impact-Reinforcing Agent

A methylmethacrylate-butadiene-styrene copolymer (MBS, C-223A, Mitsubishi rayon Co., Ltd., Average particle size: 200 nm) was used as an impact-reinforcing agent.

(D) Fluorinated Polyolefin

A polytetrafluoroethylene resin (PTFE, PTFE JF-4A2, ZHEJIANG JUSHENG FLUOROCHEMICAL CO., LTD.) was used as fluorinated polyolefin.

(E) Mineral Filler

Sheet-shaped talc (product name: UPN HS-T 0.5, Manufacturer: HAYASHI) was used.

Examples 1 to 3 and Comparative Examples 1 to 3

Each component was put according to each amount shown in Table 1 and then, met and kneaded in a twin-screw melt extruder heated at 260° C. and manufactured into a thermoplastic resin composition in a chip state. This obtained chip was dried at 80° C. for greater than or equal to 5 hours and to manufacture a specimen for measuring flame retardancy and a specimen for evaluating mechanical characteristics were manufactured by using an screw-type injector heated at 290° C.

The specimens having each composition shown in Table 1 were evaluated with respect to impact strength, thermal stability, numerical stability, and flame retardancy under the following methods, and the results are shown in Table 2.

Method of Evaluating Properties (1) IZOD: Impact strength of a 3.2 mm-long and 64 mm-long specimen was measured according to an ASTM D256 standard.

(2) CTI (Comparative Tracking index): CTI of a 3.0 mm specimen was measured according to ASTM D3638 by dropping 50 drops of an $NH_4Cl$ aqueous solution having a concentration of 0.1 wt % on the surface of the specimen one drop by one every 30 seconds and then, measuring a voltage when a carbonization did not occur, and herein, the higher CTI, the more excellent electrical properties.

(3) BPT (Ball Pressure Test): A ball pressure test at 125° C. of a 3.0 mm specimen was experimented according to KS C2006-1998 to evaluate thermal stability when a stress at a high temperature was applied thereto, and a passed specimen was regarded to have excellent dimensional stability.

*This experiment was performed by imposing a static load of 20±4N to the specimen heated at 125° C. for one hour by using a steel ball having a diameter of 5 mm, and when a specimen had a sunk dent of diameter of 2 mm or less, the specimen was classified into Pass.

(4) Flame retardancy: Flame retardancy of 2.0 mm specimens was measured according to the UL94 vertical test standard.

TABLE 2

| | Examples | | | Comparative Examples | | | | |
|---|---|---|---|---|---|---|---|---|
| | 1 | 2 | 3 | 1 | 2 | 3 | 4 | 5 |
| IZOD (kfg · cm/cm) | 65 | 60 | 75 | 20 | 12 | 70 | 65 | 12 |
| CTI (V) | 600 | 600 | 600 | 600 | 600 | 600 | 600 | 256 |
| BPT (125° C.) | pass | pass | pass | pass | Fail | pass | Fail | pass |
| Flame retardancy | 5VB | 5VB | 5VB | Fail | 5VB | Fail | 5VB | 5VB |

Referring to the results of Table 2, the thermoplastic resin compositions according to Examples 1 to 3 exhibited high CTI and thus excellent electrical properties, excellent impact strength, excellent thermal stability, that is, heat resistance stability, particularly, heat resistance stability at a high temperature, and excellent flame retardancy.

On the contrary, Comparative Examples 1 and 2 including not a cyclic phosphazene flame retardant but a phosphate

TABLE 1

| | Examples | | | Comparative Examples | | | | |
|---|---|---|---|---|---|---|---|---|
| Components | 1 | 2 | 3 | 1 | 2 | 3 | 4 | 5 |
| (A) Polycarbonate resin (parts by weight) | 100 | 100 | 100 | 100 | 100 | 100 | 100 | 100 |
| (B) Cyclic phosphazene flame retardant (parts by weight) | 3 | 4 | 4 | — | — | — | — | — |
| (B-2) Phosphorus-based flame retardant (parts by weight) | — | — | — | 3 | 5 | 3 | 5 | 3 |
| (C) Impact-reinforcing agent (parts by weight) | 1.5 | 1.5 | 2 | — | — | 2 | 2 | 2 |
| (D) Fluorinated polyolefin (parts by weight) | 1.5 | 1.5 | 1.5 | 1.5 | 1.5 | 1.5 | 1.5 | 1.5 |
| (E) Mineral filler (parts by weight) | — | — | — | — | — | — | — | 1 | ester-based compound flame retardant and not an impact-reinforcing agent exhibited low impact strength and deteriorated flame retardancy or heat resistance stability, and Comparative Examples 3 and 4 prepared respectively adding an impact-reinforcing agent to the compositions of Comparative Examples 1 and 2 exhibited excellent impact strength but deteriorated heat resistance stability or flame retardancy. In addition, Comparative Example 5 obtained by further adding a mineral filler to the composition of Comparative Example 3 exhibited sharply deteriorated impact strength.

Comparative Examples 6 to 12

Each component was put according to an amount shown in Table 3 and then, melt and kneaded in a twin-screw melt extruder heated at 260° C. and manufactured into a thermoplastic resin composition in a chip state. This obtained chip was dried at 80° C. for greater than or equal to 5 hours to manufacture a specimen for measuring flame retardancy and a specimen for evaluating mechanical characteristics by using a screw-type injector heated at 290° C.

TABLE 3

| Components | Comparative Examples | | | | | | |
|---|---|---|---|---|---|---|---|
| | 6 | 7 | 8 | 9 | 10 | 11 | 12 |
| (A) Polycarbonate resin (parts by weight) | 100 | 100 | 100 | 100 | 100 | 100 | 100 |
| (B) Cyclic phosphazene flame retardant (parts by weight) | 1 | 8 | 3 | 3 | 3 | 3 | 3 |
| (B-3) Linear phosphazene flame retardant (parts by weight) | — | — | — | — | — | — | — |
| (C) Impact-reinforcing agent (parts by weight) | 1.5 | 1.5 | 0.08 | 5.1 | 1.5 | 1.5 | 1.5 |
| (D) Fluorinated polyolefin (parts by weight) | 1.5 | 1.5 | 1.5 | 1.5 | 0.8 | 3.5 | 1.5 |
| (E) Mineral filler (parts by weight) | — | — | — | — | — | — | 1 |

Impact strength, thermal stability, and flame retardancy of the specimens having a composition shown in Table 3 were evaluated in the property-evaluating method, and the results are shown in Table 4.

TABLE 4

| | Comparative Examples | | | | | | |
|---|---|---|---|---|---|---|---|
| | 6 | 7 | 8 | 9 | 10 | 11 | 12 |
| IZOD (kgf · cm/cm) | 65 | 11 | 12 | 70 | 63 | 12 | 10 |
| CTI (V) | 240 | 600 | 275 | 600 | 600 | 600 | 251 |
| BPT (125° C.) | Pass | Fail | Pass | Fail | Pass | Pass | Pass |
| Flame retardancy | Fail | 5VB | 5VB | Fail | Fail | 5VB | 5VB |

A simple modification or change of the present invention may be readily utilized by a person skilled in the art in this field, and all such modifications and alterations are included in the scope of the present invention.

The invention claimed is:

1. A thermoplastic resin composition having excellent electrical properties, consisting essentially of:
  (A) 100 parts by weight of polycarbonate;
  (B) 2 parts by weight to 6 parts by weight of a cyclic phosphazene compound flame retardant;
  (C) 0.1 parts by weight to 5 parts by weight of an impact-reinforcing agent selected from a methyl methacrylate-butadiene-styrene copolymer, a methyl methacrylate-acrylonitrile-butadiene-styrene copolymer, a methyl methacrylate-butadiene copolymer, or a combination thereof; and
  (D) 1.5 parts by weight to 3 parts by weight of a fluorinated polyolefin,
  wherein the thermoplastic resin composition has a comparative tracking index (CTI) value of 450V to 600V.

2. The thermoplastic resin composition of claim 1, comprising 3 parts by weight to 6 parts by weight of the cyclic phosphazene compound flame retardant.

3. The thermoplastic resin composition of claim 1, wherein the cyclic phosphazene compound flame retardant is represented by Chemical Formula 1:

[Chemical Formula 1]

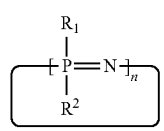

wherein, in Chemical Formula 1, $R^1$ and $R^2$ are independently an alkyl group, an alkoxy group, an aryl group, or an aryloxy group, and n is an integer ranging from 1 to 4.

4. The thermoplastic resin composition of claim 1, wherein the polycarbonate resin has a weight average molecular weight (Mw) of 10,000 g/mol to 200,000 g/mol.

5. The thermoplastic resin composition of claim 1, wherein the thermoplastic resin composition has a flame retardancy of 5VB measured in accordance with a UL94 vertical flame retardancy test.

6. The thermoplastic resin composition of claim 1, wherein the thermoplastic resin composition has an impact strength of greater than or equal to 40 kgf·cm/cm as measured in accordance with ASTM D256.

7. A molded article produced from the thermoplastic resin composition of claim 1.

8. The molded article of claim 7, wherein the molded article is an electric and/or electronic part.

9. The molded article of claim 7, wherein the molded article is a power box of a white appliance.

10. A thermoplastic resin composition having excellent electrical properties, consisting essentially of:
  (A) 100 parts by weight of polycarbonate;
  (B) 2 parts by weight to 6 parts by weight of a cyclic phosphazene compound flame retardant;
  (C) 0.1 parts by weight to 5 parts by weight of an impact-reinforcing agent selected from a methyl methacrylate-butadiene-styrene copolymer, a methyl methacrylate-acrylonitrile-butadiene-styrene copolymer, a methyl methacrylate-butadiene copolymer, or a combination thereof; and (D) 1.5 parts by weight to 3 parts by weight of a fluorinated polyolefin, wherein the thermoplastic resin composition has a comparative tracking index (CTI) value of 450V to 600V, a flame retardancy of 5VB measured in accordance with a UL94 vertical flame retardancy test, and an impact strength of greater than or equal to 40 kgf·cm/cm as measured in accordance with ASTM D256.

11. The thermoplastic resin composition of claim 10, wherein the thermoplastic resin composition has an impact strength of 45 kgf·cm/cm to 80 kgf·cm/cm as measured in accordance with ASTM D256.

12. The thermoplastic resin composition of claim 1, wherein the composition does not include talc.

13. The thermoplastic resin composition of claim 10, wherein the composition does not include talc.

14. A thermoplastic resin composition having excellent electrical properties, consisting essentially of:

(A) 100 parts by weight of polycarbonate;

(B) 2 parts by weight to 6 parts by weight of a cyclic phosphazene compound flame retardant;

(C) 0.1 parts by weight to 5 parts by weight of an impact-reinforcing agent formed by grafting an unsaturated monomer onto a rubber polymer consisting of a diene-based rubber; and (D) 1.5 parts by weight to 3 parts by weight of a fluorinated polyolefin, wherein the thermoplastic resin composition has a comparative tracking index (CTI) value of 450V to 600V.

15. The thermoplastic resin composition of claim 14, wherein the thermoplastic resin composition has an impact strength of 45 kgf·cm/cm to 80 kgf·cm/cm as measured in accordance with ASTM D256.

16. The thermoplastic resin composition of claim 15, wherein the thermoplastic resin composition has a flame retardancy of 5VB measured in accordance with a UL94 vertical flame retardancy test.

17. The thermoplastic resin composition of claim 14, wherein the composition does not include talc.

18. The thermoplastic resin composition of claim 14, wherein the impact-reinforcing agent is selected from the group consisting of methyl methacrylate-butadiene-styrene copolymers, methyl methacrylate-acrylonitrile-butadiene-styrene copolymers, methyl methacrylate-butadiene copolymers, and combinations thereof.

* * * * *